US009290373B2

(12) United States Patent
Marsala et al.

(10) Patent No.: US 9,290,373 B2
(45) Date of Patent: Mar. 22, 2016

(54) FUEL FILL SYSTEMS AND METHODS

(71) Applicant: GM Global Technology Operations LLC, Detroit, MI (US)

(72) Inventors: Vincent J. Marsala, Auburn Hills, MI (US); Philip A. Yaccarino, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 128 days.

(21) Appl. No.: 14/163,401

(22) Filed: Jan. 24, 2014

(65) Prior Publication Data

US 2015/0210528 A1 Jul. 30, 2015

(51) Int. Cl.
 *B65B 31/00* (2006.01)
 *B67D 7/04* (2010.01)
 *B60K 15/035* (2006.01)

(52) U.S. Cl.
 CPC .............. *B67D 7/048* (2013.01); *B60K 15/035* (2013.01); *B60K 15/03519* (2013.01); *B67D 7/049* (2013.01); *B67D 7/0492* (2013.01); *B60K 2015/03514* (2013.01); *B60K 2015/03538* (2013.01); *B60K 2015/03576* (2013.01)

(58) Field of Classification Search
 CPC ....... B67D 7/048; B67D 7/049; B67D 7/0492

USPC .......... 141/7, 59, 302, 303; 137/587; 220/86.2
See application file for complete search history.

(56) References Cited

U.S. PATENT DOCUMENTS

| 4,095,609 | A  | * | 6/1978  | Martin ........................... 137/43 |
| 5,819,796 | A  | * | 10/1998 | Kunimitsu et al. .......... 137/587 |
| 2003/0213527 | A1 | * | 11/2003 | Yanase et al. .................. 141/59 |
| 2006/0053868 | A1 | * | 3/2006  | Chung et al. ................... 73/49.7 |
| 2012/0186333 | A1 | * | 7/2012  | Nishimura et al. ........ 73/40.5 R |

FOREIGN PATENT DOCUMENTS

| EP | 1332906 B1 | 3/2005 |
| EP | 1297984 B1 | 4/2005 |

* cited by examiner

*Primary Examiner* — Jason K Niesz
(74) *Attorney, Agent, or Firm* — BrooksGroup

(57) ABSTRACT

A number of variations may include a product comprising: a mechanical seal fuel fill system including a fill line for transporting fuel into a fuel tank. The fill line may be operatively connected to a fill cup to receive a fill nozzle. The fuel fill system may also include a vapor canister to receive fuel vapors displaced during refueling from the fuel tank. The vapor canister may be fed via a canister vent valve inside the fuel tank. The fuel system may also include a recirculation line connecting the fuel tank to the fill line. The recirculation line may include an auxiliary valve in the fuel tank. The recirculation valve and the auxiliary valve may be in a parallel arrangement.

13 Claims, 2 Drawing Sheets

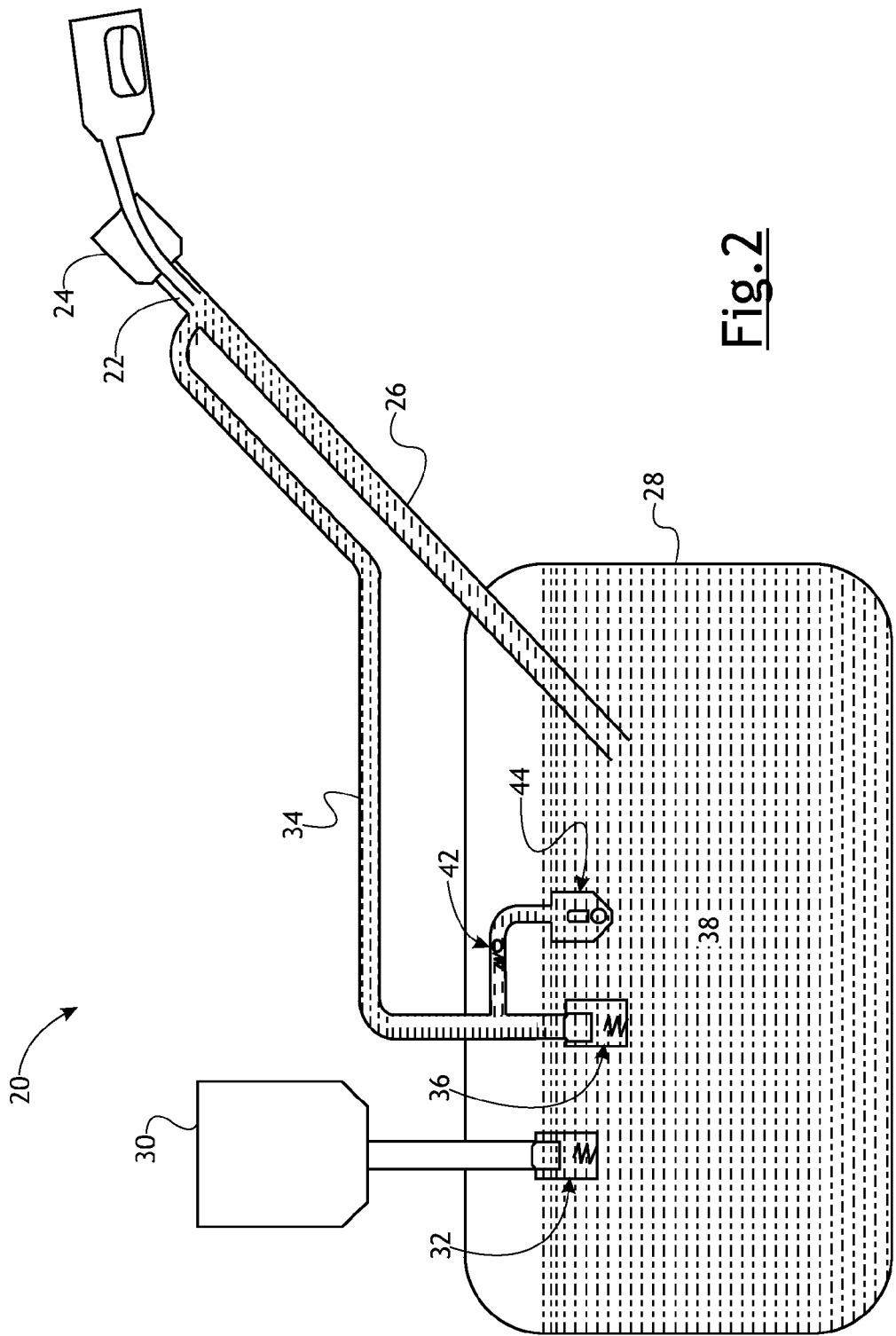

FUEL FILL SYSTEMS AND METHODS

TECHNICAL FIELD

The field to which the disclosure generally relates to vehicle fuel fill systems.

BACKGROUND

Some vehicle fuel fill systems may include means to help prevent or reduce vapor expulsion into the environment.

SUMMARY OF ILLUSTRATIVE VARIATIONS

A number of variations may include a product comprising a mechanical seal fuel fill system including a fill line for transporting fuel into a fuel tank. The fill line may be operatively connected to a fill cup to receive a fill nozzle. A vapor canister to receive fuel vapors displaced during refueling from the fuel tank may be fed via a canister vent valve inside the fuel tank. A recirculation line connecting the fuel tank to the fill line may include an auxiliary valve in the fuel tank. The recirculation valve and the auxiliary valve may be in a parallel arrangement.

A number of variations may include a method comprising providing a mechanical seal fuel fill system including a fill line for transporting fuel into a fuel tank. The fill line may be operatively connected to a fill cup to receive a fill nozzle. A vapor canister to receive fuel vapors displaced during refueling from the fuel tank may be fed via a canister vent valve inside the fuel tank. A recirculation line connecting the fuel tank to the fill line may include an auxiliary valve in the fuel tank. The recirculation valve and the auxiliary valve may be in a parallel arrangement.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 2 is a semi-schematic sectional view of a portion of a fuel fill system according to a number of variations during a fill event.

DETAILED DESCRIPTION OF ILLUSTRATIVE VARIATIONS

Figure 1:
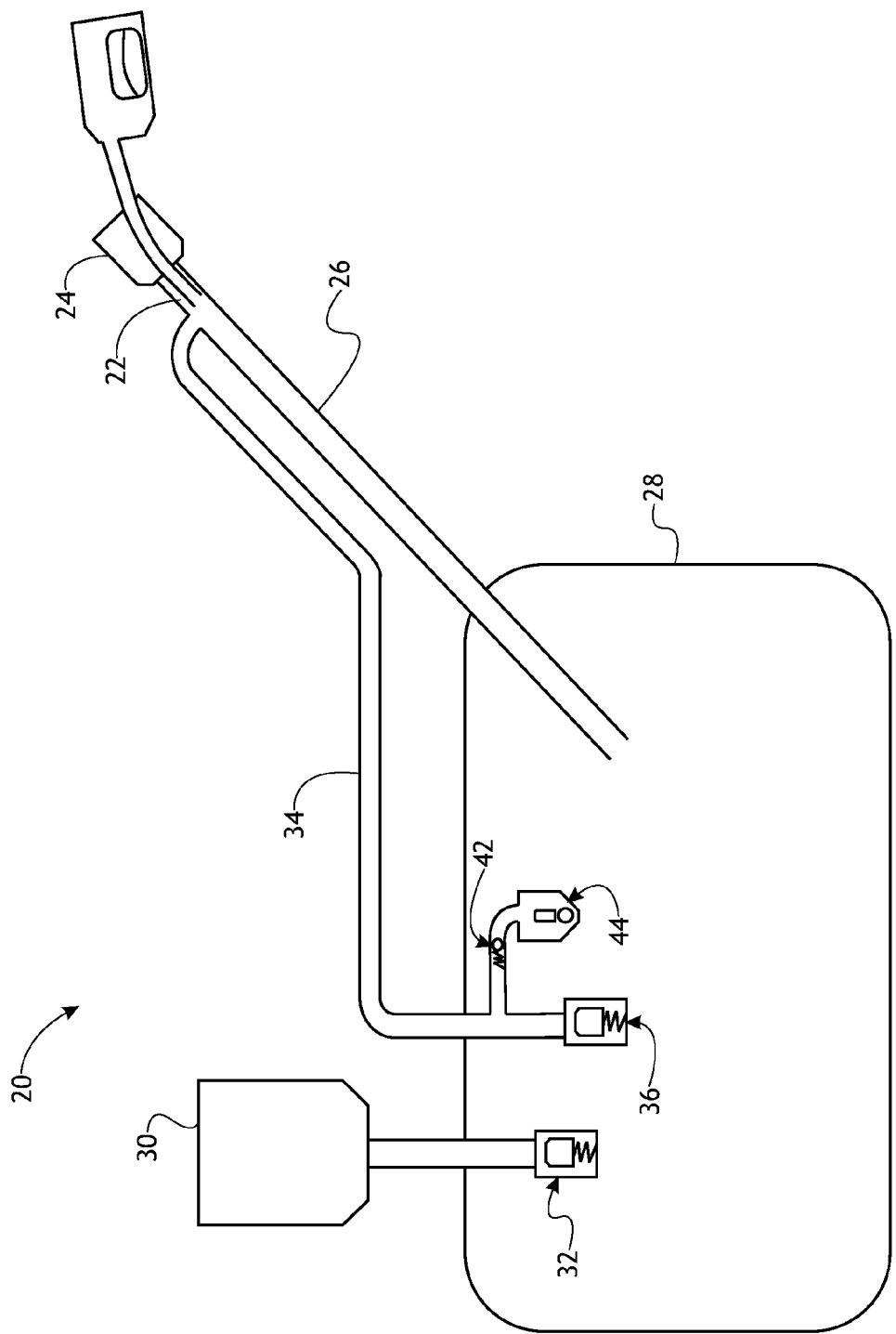
FIG. 1 is a semi-schematic sectional view of a portion of a fuel fill system according to a number of variations.

The following description of the variations is merely illustrative in nature and is in no way intended to limit the scope of the invention, its application, or uses.

FIGS. 1 and 2 depict an example of a fuel fill system 20 for a vehicle. A fill nozzle 22 for insertion into a fill cup 24 may be open to atmosphere. A fill line 26 may be routed between a fuel tank 28 and the fill cup 24. In some circumstances, fuel 38 entering the fill line 26 may create a vacuum at the fill cup 24, which may pull in ambient air into the fill line 26 and therefore create a volume of vapor entrained during refueling.

The fuel fill system 20 also includes a vapor canister 30 fed via a canister vent valve 32. The canister vent valve 32 is internal to the fuel tank 28, connected by a tube to the vapor canister 30. The fuel fill system 20 may vent fuel vapors displaced (and/or entrained) during refueling to a carbon bed within the vapor canister 30 when the canister vent valve 32 is open. The canister vent valve 32 may be a float type valve that is triggered to close by a rising fuel level.

In a number of variations, fuel fill system 20 may include an interface between the fill nozzle 22 and the fuel fill cup 24 that is substantially sealed via a mechanical seal system. Some mechanical seal systems may substantially eliminate ambient air entrainment during refueling, thereby reducing vapor generation.

The fuel fill system 20 may include a recirculation line 34 between the fuel tank 28 and the fill line 26. The recirculation line 34 may be fed via a recirculation valve 36 internal to the fuel tank 28. Recirculation through the recirculation line 34 when the recirculation valve 36 is open may provide for recirculation of a portion of entrained vapor that may accumulate in the fuel tank 28, reducing fuel vapors generated during refueling. The recirculation valve 36 may be a float type valve that is triggered to close by a rising fuel level.

In a number of variations, fuel 38 may be filled into the fuel tank 28 from the fill nozzle 22. Displaced vapors may travel through the fuel tank 28, and may be primarily channeled to the vapor canister 30 and partially recirculated via the recirculation line 34.

In a number of variations, the recirculation valve 36 and canister vent valve 36 may be in close proximity, with the canister vent valve 32 being slightly higher relative to the top of the vehicle. This may protect against an overfill condition when the mechanical seal is completely damaged.

During a fill event, fuel may back up the fill line 26 and cause tripping/shutting off of the fill nozzle 26. A vacuum at the fill nozzle 22 may disable the fill nozzle 22 from engagement. If the recirculation line 34 is sealed, the liquid in the fill line 26 may not be able to fall to the fuel tank 28 and a vacuum may be formed at the fill nozzle 22. The fuel tank 28 may remain free to vent through the vapor canister vent valve 32 and into the vapor canister 30 while the canister vent valve 32 is open.

In a condition where the mechanical seal is only partially damaged or has a small leak, the fill cup 24 may be partially sealed to the fill nozzle 22. Therefore, fuel 38 may fall to the fuel tank 28 through the fill line 26 even after the fill nozzle 22 is tripped off as the vacuum at the fill nozzle 22 is relieved through the small leak. Subsequent engagement of the fill nozzle 22 then may generate a high pressure in the fill line 26, pushing fuel 38 to the fuel tank 28 until the fill nozzle 22 is again tripped by vacuum or the rising column of fuel 38.

A number of variations may address an undesirable condition where the mechanical seal in a fuel fill system may encounter a small leak that causes overfilling and/or excessive pressure in the fuel tank 28. A number of variations may include a feedback mechanism that may disable the fill nozzle 22 to avoid re-engagement once the fuel tank 28 is full. A number of variations may achieve this feedback function with one or more valves in parallel or integral to the recirculation valve 36.

In a number of variations, fuel fill system 20 includes an auxiliary valve 42 in fluid communication with the recirculation valve 36. The auxiliary valve 42 may be operatively connected to an auxiliary line that has an outlet into the fuel tank 28 and another outlet into the recirculation line 34. During fueling, the tank fill level may cause the recirculation valve 36 and the canister vent valve 32 to close, thereby generating increased pressure inside the fuel tank 28. The auxiliary valve 42 allows pressure generated in the fuel tank 28 to push fuel 38 up the recirculation line 34, thereby flooding the fill line 26 as shown in FIG. 2. The flooded fill line 26 may disable the fill nozzle 22, thereby preventing re-engagement of the fill nozzle 22 that may otherwise cause overfill and/or pressure escalation conditions.

A number of variations may incorporate the auxiliary valve 42 integral with the recirculation valve 36. In a number of variations, the integral arrangement of the auxiliary valve 42 with the recirculation valve 36 may maintain a relative position of the canister vent valve in the fuel fill system 20. The integral construction of the auxiliary valve 42 may conserve packaging space and maintain performance objectives for venting of the fuel tank 28. In a number of variations, the auxiliary valve 42 may be a one way check valve.

In a number of variations, a rollover valve 44 stops fluid from entering the auxiliary valve 42 from the fuel tank 28 in the event of an inverted or aggressive vehicle angle. Accordingly, the rollover valve 44 may be located slightly below the canister vent valve 32 in a number of variations. The rollover valve 44 may be a non-float type valve.

It is to be understood that a number of variations may substantially eliminate the undesirable conditions of an overfull fuel tank and/or excessive pressure retained in the fuel tank.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product including a mechanical seal fuel fill system including a fill line for transporting fuel into a fuel tank, the fill line operatively connected to a fill cup to receive a fill nozzle; a vapor canister to receive fuel vapors displaced during refueling from the fuel tank, the vapor canister fed via a canister vent valve inside the fuel tank; and a recirculation line connecting the fuel tank to the fill line, wherein the recirculation line includes an auxiliary valve in the fuel tank, the recirculation valve and the auxiliary valve in a parallel arrangement.

Variation 2 may include a product as set forth in Variation 1 wherein the fuel fill system includes a mechanical seal defined at the interface of the fill nozzle and the fill cup.

Variation 3 may include a product as set forth in any of Variations 1-2 wherein the auxiliary valve is a one way check valve.

Variation 4 may include a product as set forth in any of Variations 1-3 wherein the recirculation valve is a float-type valve.

Variation 5 may include a product as set forth in any of Variations 1-4 further comprising a rollover valve in parallel with the recirculation valve.

Variation 6 may include a product as set forth in any of Variations 1-5 wherein the rollover valve is a non-float type valve.

Variation 7 may include a method comprising providing a mechanical seal fuel fill system including a fill line for transporting fuel into a fuel tank, the fill line operatively connected to a fill cup to receive a fill nozzle; a vapor canister to receive fuel vapors displaced during refueling from the fuel tank, the vapor canister fed via a canister vent valve inside the fuel tank; and a recirculation line connecting the fuel tank to the fill line, wherein the recirculation line includes an auxiliary valve in the fuel tank, the recirculation valve and the auxiliary valve in a parallel arrangement Variation 8 may include a method as set forth in Variation 1 wherein the fuel fill system includes a mechanical seal defined at the interface of the fill nozzle and the fill cup.

Variation 9 may include a method as set forth in any of Variations 7-8 wherein the auxiliary valve is a one way check valve.

Variation 10 may include a method as set forth in any of Variations 7-9 wherein the recirculation valve is a float-type valve.

Variation 11 may include a method as set forth in any of Variations 7-10 further comprising a rollover valve in parallel with the recirculation valve.

Variation 12 may include a method as set forth in any of Variations 7-11 wherein the rollover valve is a non-float type valve.

Variation 13 may include a method comprising providing a mechanical seal fuel fill system including a fill line for transporting fuel into a fuel tank, the fill line operatively connected to a fill cup to receive a fill nozzle; a vapor canister to receive fuel vapors displaced during refueling from the fuel tank, the vapor canister fed via a canister vent valve inside the fuel tank; and a recirculation line connecting the fuel tank to the fill line, wherein the recirculation line includes an auxiliary valve in the fuel tank, the recirculation valve and the auxiliary valve in a parallel arrangement.

The above description of select variations within the scope of the invention is merely illustrative in nature and, thus, variations or variants thereof are not to be regarded as a departure from the spirit and scope of the invention.

What is claimed is:

1. A product comprising:
   a mechanical seal fuel fill system including:
   a fill line for transporting fuel into a fuel tank, the fill line operatively connected to a fill cup to receive a fill nozzle;
   a vapor canister to receive fuel vapors displaced during refueling from the fuel tank, the vapor canister fed via a canister vent valve inside the fuel tank; and
   a recirculation line connecting the fuel tank to the fill line, wherein the recirculation line includes an auxiliary valve in the fuel tank and a recirculation valve wherein the recirculation valve and the auxiliary valve are in a parallel arrangement.

2. A product as set forth in claim 1 wherein the fuel fill system includes a mechanical seal defined at the interface of the fill nozzle and the fill cup.

3. A product as set forth in claim 1 wherein the auxiliary valve is a one way check valve.

4. A product as set forth in claim 1 wherein the recirculation valve is a float-type valve.

5. A product as set forth in claim 1 further comprising a rollover valve in parallel with the recirculation valve.

6. A product as set forth in claim 5 wherein the rollover valve is a non-float type valve.

7. A method comprising:
   providing a mechanical seal fuel fill system including:
   a fill line for transporting fuel into a fuel tank, the fill line operatively connected to a fill cup to receive a fill nozzle;
   a vapor canister to receive fuel vapors displaced during refueling from the fuel tank, the vapor canister fed via a canister vent valve inside the fuel tank; and
   a recirculation line connecting the fuel tank to the fill line, wherein the recirculation line includes an auxiliary valve in the fuel tank and a recirculation valve wherein the recirculation valve and the auxiliary valve are in a parallel arrangement.

8. A method as set forth in claim 7 wherein the fuel fill system includes a mechanical seal defined at the interface of the fill nozzle and the fill cup.

9. A method as set forth in claim 7 wherein the auxiliary valve is a one way check valve.

10. A method as set forth in claim 7 wherein the recirculation valve is a float-type valve.

11. A method as set forth in claim 7 further comprising a rollover valve in parallel with the recirculation valve.

12. A method as set forth in claim 11 wherein the rollover valve is a non-float type valve.

13. A method comprising:
   filling a fuel tank through a fill line operatively connected to a fill cup to receive a fill nozzle;
   establishing vacuum pressure in a fuel fill line from a fuel fill nozzle; fuel;
   receiving fuel vapors displaced during refueling from the fuel tank in a vapor canister, the vapor canister fed via a canister vent valve inside the fuel tank; and
   providing a recirculation line connecting the fuel tank to the fill line, wherein the recirculation line includes an auxiliary valve in the fuel tank and a recirculation valve wherein the recirculation valve and the auxiliary valve are in a parallel arrangement.

\* \* \* \* \*